United States Patent

Kazmierczak et al.

[11] Patent Number: 5,982,581
[45] Date of Patent: Nov. 9, 1999

[54] DISC CLAMP WITH HEAD CLEARANCE

[75] Inventors: Frederick F. Kazmierczak, San Jose; Michael K. Andrews, Soquel; Michael Raffetto, Scotts Valley, all of Calif.

[73] Assignee: Seagate Technology, Inc., Scotts Valley, Calif.

[21] Appl. No.: 08/420,441

[22] Filed: Apr. 10, 1995

Related U.S. Application Data

[63] Continuation of application No. 08/222,088, Apr. 4, 1994, abandoned.

[51] Int. Cl.$^6$ .......................... G11B 17/022; G11B 17/038
[52] U.S. Cl. ...................................... 360/98.08; 360/99.12
[58] Field of Search ............................ 360/97.03, 98.01, 360/98.02, 98.07, 98.08, 99.05, 99.12, 98.06; 369/270, 271

[56] References Cited

U.S. PATENT DOCUMENTS

| | | | |
|---|---|---|---|
| 4,570,256 | 2/1986 | Tamaru | 369/271 |
| 4,639,802 | 1/1987 | Neubaver et al. | 360/98 |
| 4,809,102 | 2/1989 | Hatchett et al. | 360/97.03 |
| 4,835,637 | 5/1989 | Mach et al. | 360/96.02 |
| 4,922,354 | 5/1990 | Edwards | 360/97.03 |
| 5,101,306 | 3/1992 | Johnson | 369/270 |

FOREIGN PATENT DOCUMENTS 2023257  12/1979  United Kingdom ............... 360/98.08

*Primary Examiner*—David L. Ometz
*Attorney, Agent, or Firm*—Westman, Champlin & Kelly, P.A.

[57] ABSTRACT

The present invention includes a data disc support assembly for supporting a data disc relative to a head so data on a surface of the disc is accessible by the head. The support assembly includes a hub which has first and second axial ends and a flange extending from the second axial end. The flange supports the data disc. A clamp is connected to the hub to rigidly connect the data disc to the hub. The clamp has a first generally annular portion contacting the data disc and a second generally annular portion extending axially away from the hub beyond the first annular portion. The second annular portion is spaced from the data disc by a distance greater than the height of the head.

10 Claims, 3 Drawing Sheets

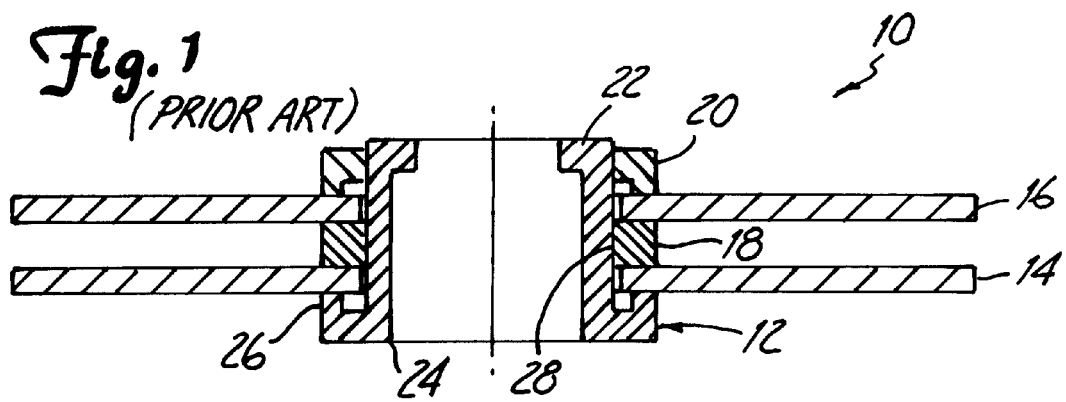
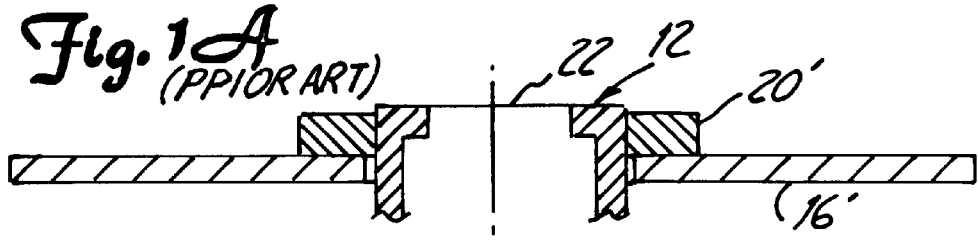
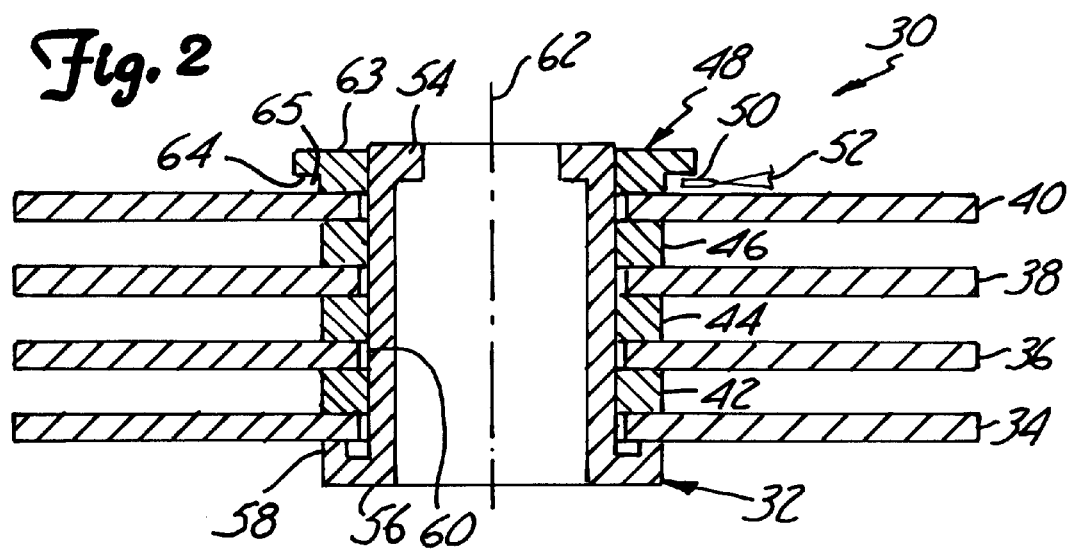
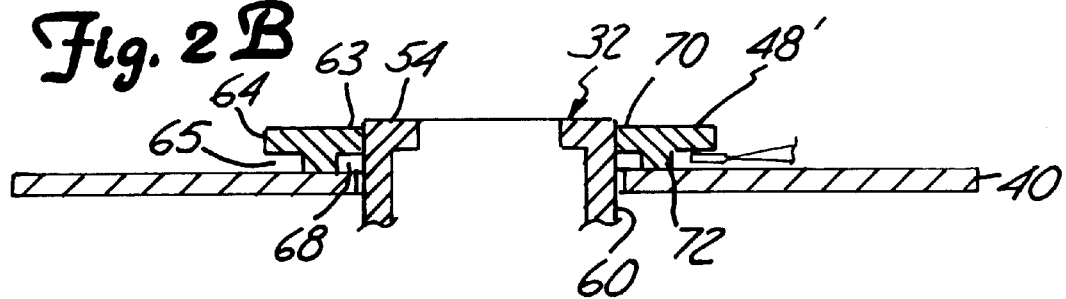

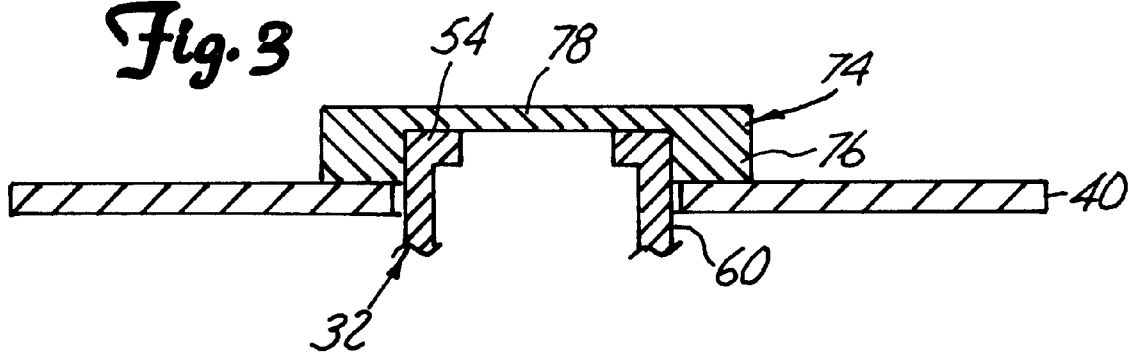
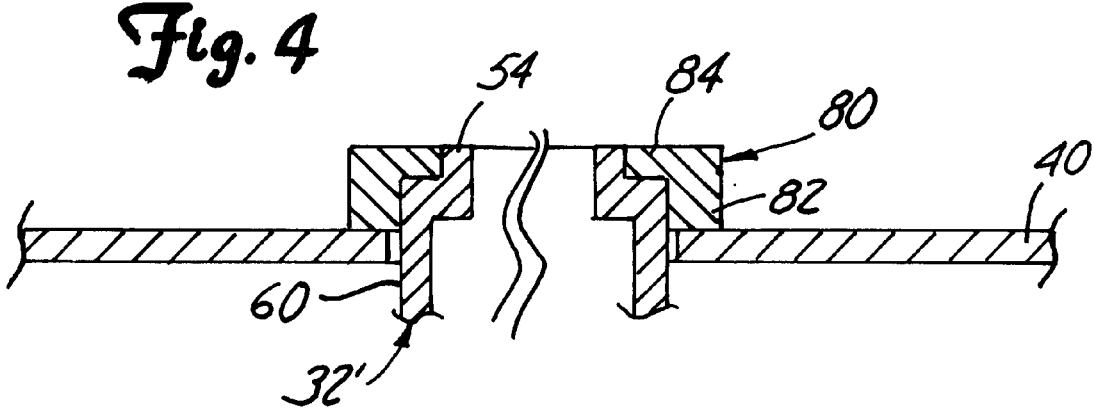
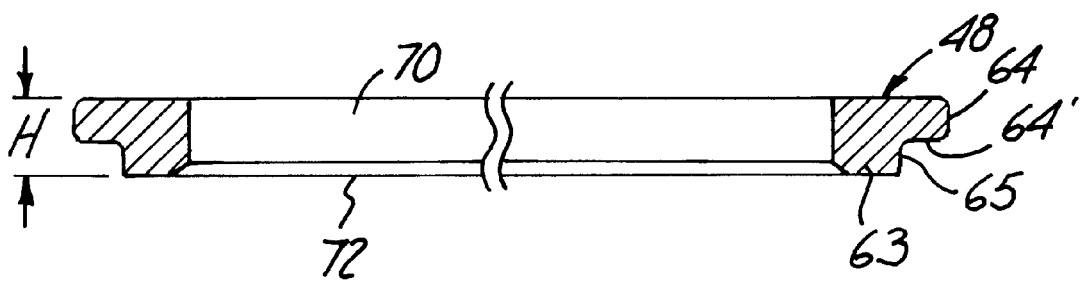

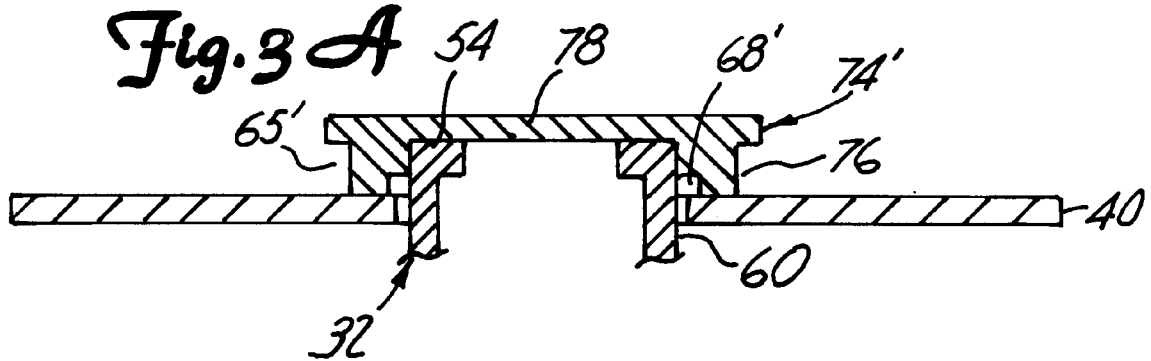
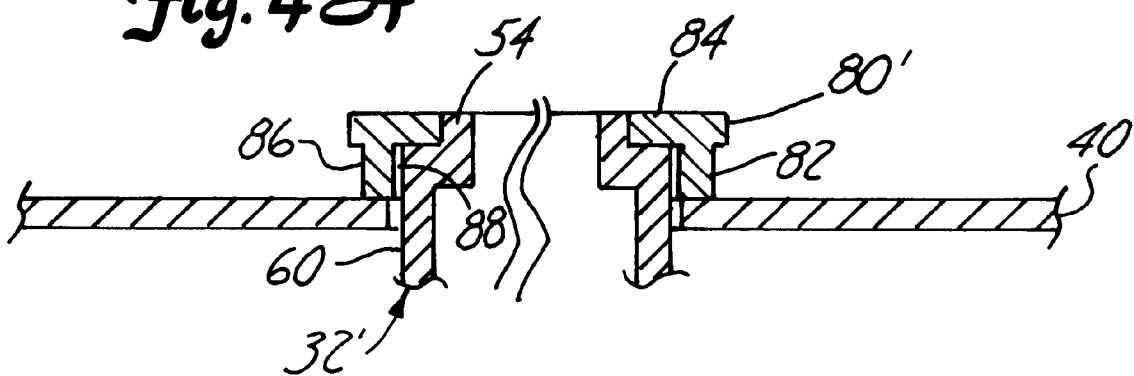

DISC CLAMP WITH HEAD CLEARANCE

This is a continuation of application Ser. No. 08/222,088, filed Apr. 4, 1994, now abandoned.

BACKGROUND OF THE INVENTION

The present invention relates to disc drives. More particularly, the present invention relates to a device for clamping discs to a hub in a disc drive.

A typical disc drive includes one or more magnetic discs mounted for rotation on a hub or spindle. Where more than one magnetic disc is used, the discs are spaced apart from one another axially along the hub by spacers mounted between the discs. Conventional hubs typically include a flange portion which extends from one of the axial ends of the hub. The discs and spacers are placed concentrically about the hub and supported by the flange portion of the hub. The plurality of magnetic discs and the spacers are clamped down onto the flange portion of the hub using a clamp which is placed on the axial end of the hub, opposite the flange. Thus, the discs and spacers are all clamped to the hub for rotation with the hub about an axis of rotation generally defined by the radial center of the hub.

A typical magnetic disc drive also includes a transducer supported by a hydrodynamic air bearing which flies above each magnetic disc. The transducer and hydrodynamic air bearing are collectively referred to as a data head. A drive controller is conventionally used for controlling the disc drive system based on commands received from a host system. The drive controller controls the disc drive to retrieve information from the magnetic discs and to store information on the magnetic discs.

An electromechanical actuator operates within a negative feedback, closed-loop servo system. The actuator moves the data head radially over the disc surface for track seek operations and holds the transducer directly over a track on the disc surface for track following operations.

Information is typically stored on the magnetic discs by providing a write signal to the data head to encode flux reversals on the surface of the magnetic disc representing the data to be stored. In retrieving data from the disc, the drive controller controls the electromechanical actuator so that the data head flies above the magnetic disc, sensing the flux reversals on the magnetic disc and generating a read signal based on those flux reversals. The read signal is then decoded by the drive controller to recover the data represented by flux reversals stored on the magnetic disc, and consequently represented in the read signal provided by the data head.

As industry pressure requires disc drives to be reduced in size, the axial height of the hub, and consequently the axial height of the entire disc file, becomes critical. In past systems, the clamp used to hold the discs in place about the hub was screwed onto the hub with screws running in the axial direction. However, since the axial height of the hub has become critical, the screws used to fasten the clamp to the hub take up an undesirable amount of axial space.

Therefore, a heat shrink clamp was developed. Such a clamp is described in greater detail in U.S. Pat. No. 4,639,802. Such clamps typically include a clamp ring which has an inner diameter that is slightly smaller than the outer diameter of one axial end of the hub. The clamp ring is responsive to thermal energy and expands when thermal energy is applied to it and contracts when thermal energy is removed from it. Therefore, to assemble the clamp ring to the hub, the clamp ring is first heated, thereby expanding such that the inner diameter of the clamp ring is slightly larger than the outer diameter of the hub. The clamp ring is then placed about the hub and allowed to cool to establish a frictional fit with the outer surface of the hub.

Just prior to placing the clamp on the hub, the plurality of discs and spacers arranged about the hub are subjected to an axial load. The clamp ring is put in place and allowed to form its frictional fit before the axial load is removed. Thus, the clamp ring clamps the spacers and the magnetic discs to the flange located at the second axial end of the hub.

Such thermally responsive clamps eliminated the need for screws to hold the discs in place about the hub. Thus, such clamps have been effective in reducing the overall axial height of the disc file. However, the load which can be supported by such clamps is directly dependent upon the cross-sectional area (i.e., the volume) of the clamp. In disc drives which have four discs, the load which the clamp must support is essentially twice that of disc drives which have only two discs. Therefore, the cross-sectional area of the clamp must double. In order to double the cross-sectional area of the clamp without increasing the axial height of the clamp, the clamp must be made thicker, in a radial direction, extending away from the hub. However, increasing the distance that the clamp extends radially away from the hub causes the clamp to cover the inner radii of the disc surface over which the clamp is located. This reduces useable disc space and hence storage capacity of the disc drive.

SUMMARY OF THE INVENTION

The present invention includes a data disc support assembly for supporting a data disc relative to a head so data on a surface of the disc is accessible by the head. The support assembly includes a hub which has first and second axial ends and a flange extending from the second axial end. The flange supports the data disc. A clamp is connected to the hub to rigidly connect the data disc to the hub. The clamp has a first generally annular portion contacting the data disc and a second generally annular portion extending axially away from the hub beyond the first annular portion. The second annular portion is spaced from the data disc by a distance greater than the height of the head.

BRIEF DESCRIPTION OF THE DRAWINGS

FIG. 1 is a side cross-sectional view of a disc support assembly of the prior art.

FIG. 1A is a cross-sectional view of a portion of a second disc support assembly of the prior art.

FIG. 2 is a cross-sectional view of a disc support assembly of the present invention.

FIG. 2A is a cross-sectional view of a clamp ring according to the present invention.

FIG. 2B is a cross-sectional view of a portion of a disc support assembly including a second embodiment of a clamp ring according to the present invention.

FIG. 3 is a cross-sectional view of third embodiment of a clamp ring according to the present invention.

FIG. 3A is a cross-sectional view of a fourth embodiment of a clamp ring according to the present invention.

FIG. 4 is a cross-sectional view of a fifth embodiment of a clamp ring according to the present invention.

FIG. 4A is a cross-sectional view of a sixth embodiment of a clamp ring according to the present invention.

DETAILED DESCRIPTION OF THE PREFERRED EMBODIMENTS

FIG. 1 is a cross-sectional view of a rigid magnetic disc support assembly 10. Support assembly 10 includes hub 12, first rigid magnetic disc 14, second rigid magnetic disc 16, spacer 18 and clamp ring 20. Hub 12 includes first axial end 22 and second axial end 24. An annular flange 26 is generally disposed at second axial end 24 and is preferably formed integrally with hub 12. Discs 14 and 16 are concentrically arranged about an exterior surface 28 of hub 12. Discs 14 and 16 are spaced apart axially along the exterior surface 28 of hub 12 by spacer ring 18. Clamp ring 20 is connected, via a frictional fit, to second end 22 of hub 12. Clamp ring 20 contacts a surface of disc 16 capturing discs 14 and 16 and spacer 18 between clamp ring 20 and flange 26 about hub 12.

In the embodiment shown in FIG. 1, clamp 20 is a thermally responsive heat shrink clamp which is assembled onto hub 12 by applying thermal energy to clamp 20, placing it on exterior surface 28 of hub 12, and allowing it to cool and thereby form a frictional fit with hub 12. Thermally responsive clamp 20 has worked adequately for systems in which only two discs were used. However, in systems in which more than two discs are used, the clamping load which must be exerted by clamp 20 in order for assembly 10 to perform properly increases. In order to increase the clamp load exerted by clamp 20, the cross-sectional area (and hence the volume), of clamp 20 must also be increased. For example, in a system in which four discs are to be mounted on hub 12, the clamping load which clamp 20 is required to exert roughly doubles. Therefore, the cross-sectional area of clamp 20 must also double.

FIG. 1A shows a prior art system in which four discs are carried by hub 12. In the system shown in FIG. 1A, clamp ring 20' is shown clamped to the first axial end 22 of hub 12. While hub 12 shown in FIG. 1A carries four magnetic discs, only one (disc 16') is shown for the sake of clarity.

Since hub 12 is now carrying twice the number of discs as hub 12 shown in FIG. 1, clamp ring 20' must exert roughly twice the clamping force of clamp ring 20. Thus, the cross-sectional area of clamp ring 20' is roughly twice that of clamp ring 20. While the present figures are not drawn to scale, it will be recognized that in order to increase the cross-sectional area of clamp ring 20' by a factor of two over that of clamp ring 20, without increasing the axial height of clamp ring 20' over that of clamp ring 20, the radial dimension of clamp ring 20' must be doubled. However, this requires clamp ring 20' to extend well out onto the surface of the disc 16' with which it is in contact. This covers the inner radii of disc 16' thereby consuming disc space and storage capacity of the disc drive in which the assembly is used.

FIG. 2 shows disc support assembly 30 of the present invention. Support assembly 30 includes hub 32, magnetic discs 34, 36, 38 and 40, spacers 42, 44 and 46, and clamp 48. FIG. 2 also illustrates a data head 50 coupled to a portion of a flexure arm 52. Hub 32 has a first axial end 54 and a second axial end 56. A flange 58 is generally disposed at the second axial end 56 of hub 32. In the preferred embodiment, flange 58 is integrally formed with the remainder of hub 32. Discs 34, 36, 38 and 40 (which in the preferred embodiment are rigid magnetic discs) are concentrically disposed about an outer surface 60 of hub 32, and are separated by spacers 42, 44 and 46. Spacers 42, 44 and 46 are also generally concentrically disposed about the outer surface 60 of hub 32. Discs 34, 36, 38 and 40, as well as spacers 42, 44 and 46 are supported by flange 58. In assembly, the discs and spacers are placed concentrically about surface 60 of hub 32 and an axial load is applied holding the discs and spacers against flange 58. Then, clamp 48 is clamped to first axial end 54 of hub 32 retaining at least a portion of the axial load applied prior to the assembly of clamp 48 onto hub 32. By retaining this load, clamp 48 captures discs 34, 36, 38 and 40 as well as spacers 42, 44 and 46 between itself and flange 58 thereby securing all portions of assembly 30 for rotation with hub 32 about axis 62.

In the preferred embodiment, clamp 48 is a thermally responsive clamp which has an inner diameter slightly smaller than the outer diameter of hub 32. Upon applying thermal energy to clamp 48, it expands so that its inner diameter is slightly larger than the outer diameter of hub 32. Clamp 48 is then placed over second axial end 54 of hub 32 and allowed to cool. Upon cooling, clamp 48 shrinks to its original size thereby establishing a frictional fit between its inner diameter and the outer diameter of hub 32 at second axial end 54.

Also, in the preferred embodiment, clamp 48 includes a body portion 63 and a ring portion 64. Body portion 63 has a lower surface which contacts disc 40. Ring portion 64 has a lower surface which is spaced from disc 40. Thus, body portion 63 and ring portion 64 define a notch 65 which is large enough to accommodate data head 50 flying above the surface of disc 40. In this manner, while the volume of clamp 48 is twice that of clamp 20 (shown in FIG. 1), and while this allows clamp 48 to exert double the clamping load of clamp 20, clamp 48 consumes no more disc space (and hence no more disc drive memory capacity) than clamp 20. Further, clamp 48 has no greater axial height than clamp 20 and therefore does not increase the overall axial height of the disc file assembled onto support assembly 30. Thus, clamp 48 provides significant advantages over prior disc clamps.

FIG. 2A shows an enlarged cross-sectional view of clamp 48. In the preferred embodiment, ring portion 64 has a lower surface 64' which, when clamp 48 is assembled, is approximately 0.031 inches above the surface of disc 40. Also, in the preferred embodiment, the overall height H of clamp 48 is approximately 0.052 inches. Since the head is only typically 15 mils in height, it can easily slide below ring portion 64 through notch 65. Finally, in the preferred embodiment, clamp 10 is formed of 430 annealed stainless steel having 25% minimum elongation and 0.2% minimum yield strength.

FIG. 2A also illustrates that clamp 48 preferably has a cylindrical axial opening 70 which has a lower end 72 defined by a chamfered periphery. The chamfered periphery of lower end 72 provides for easier assembly of clamp 48 over second end 54 of hub 32.

FIG. 2B illustrates another embodiment of the present invention. FIG. 2B shows a portion of support assembly 30 with a modified clamp 48'. Clamp 48' includes annular ring portion 64 and notch 65. However, body portion 63 of clamp 48' is modified to include a second notch 68. Notch 68 is defined by two fingers 70 and 72 in body portion 63. Finger portion 70 contacts the exterior surface 60 of hub 32 while finger portion 72 contacts the surface of disc 40. Finger portion 72 is spaced from the exterior surface 60 of hub 32 in a radial direction. By radially spacing finger portion 72 from surface 60, the load applied to disc 40 is more evenly distributed to avoid coning or warping of disc 40 under the load applied by clamp 48'. The radial distance by which finger portion 72 is spaced from surface 60 will vary depending upon the axial load applied by clamp 48', but is preferably optimized to minimize coning of disc 40.

FIG. 3 is a cross-sectional view of a portion of disc support assembly 30 showing another embodiment of the present invention. Similar items are similarly numbered to those shown in FIG. 2B. In the preferred embodiment shown in FIG. 3, clamp 74 is provided for applying the clamping load to the remainder of assembly 30. As with clamps 48 and 48', clamp 74 is a thermally responsive clamp which is heated and expanded to fit over hub 32. Clamp 74 is then allowed to cool forming a frictional fit with hub 32.

Clamp 74 has an annular ring portion 76 which extends about the exterior surface 60 of hub 32. Clamp 74 also has a connecting portion 78 which extends across substantially the entire first axial end 54 of hub 32. Connecting portion 78 also preferably has a central aperture for communicating with the center of hub 32. Annular ring portion 76 extends axially away from hub 32 no further than body portion 63 of clamp 48. Thus, as with clamp 48, clamp 74 does not consume any additional space on the surface of disc 40. Rather, connecting portion 78 is provided to increase the cross-sectional area of clamp 74 to facilitate application of the increased axial load required for clamp 74 to connect more than two discs to hub 32.

Clamp 74 is preferably used in systems in which disc space is more critical than the axial height of the disc file. In the alternative, the first axial end 54 of hub 32 can be reduced to accommodate the added height of connecting portion 78 so that the overall axial height of the disc file in support assembly 30 is within acceptable limits.

FIG. 3A illustrates another embodiment of the present invention having modified clamp 74'. As with clamp 48' (shown in FIG. 2B), clamp 74' is provided with a pair of notches 65' and 68'. Notch 65' is provided to further increase the disc space available on disc 40. Notch 65' is dimensioned to allow data head 50 to pass within notch 65', below the radial outer diameter of connecting portion 78. Notch 68' is provided to space the portion of clamp 74' which contacts disc 50 from the outer surface 60 of hub 32. This causes favorable distribution of the axial load applied by clamp 74' to reduce coning or other deformation of disc 40 caused by the applied axial load.

FIG. 4 shows another preferred embodiment of the present invention including modified hub 32' and clamp 80. Modified hub 32' is provided with an annular notch in first axial end 54. Clamp 80 has a body portion 82 and an axially inwardly extending finger portion 84. As with clamps 48 and 74, clamp 80 is a thermally responsive clamp which expands to fit over the exterior surface 60 of hub 32' and the notch in the first axially end 54 of hub 32'. When clamp 80 is allowed to cool, it forms a frictional fit with hub 32'.

Finger portion 84 extends into, and mates with, the notch in the first axial end 54 of hub 32'. Finger portion 84 thus increases the cross-sectional area of clamp 80 without either increasing the axial height of clamp 80, or increasing the distance by which clamp 80 extends radially out onto the surface of disc 40. Clamp 80 is capable of exerting the axial load required to clamp an increased number of discs in assembly 30 without increasing the axial height of assembly 30 and without consuming disc space on disc 40.

FIG. 4A illustrates another preferred embodiment of the present invention which includes modified clamp 80'. As with clamp 80, clamp 80' includes body portion 82 and finger portion 84. Finger portion 84 mates with the annular notch in the first axial end 54 of hub 32'. However, body portion 82 is provided with a first notch 86 and a second notch 88. Notch 86 is preferably dimensioned such that head 50 can pass through notch 86 when flying over the surface of disc 40. Notch 88 is provided to space body portion 82 from the exterior surface 60 of hub 32' to better distribute the load applied by clamp 80' to reduce coning or other warping of disc 40.

The present invention provides a support assembly 30 that includes a hub about which a plurality of discs are concentrically arranged. The hub has a first axial end 54 and a second axial end 56. A support member is disposed about second axial end 56 to support the discs. A clamp is disposed about the first axial end 54 of the hub to hold the discs in place and rigidly attach them for rotation with the hub about axis 62. The clamp has increased cross-sectional area to facilitate provision of an increased axial load without consuming additional disc space. In addition, the clamp preferably has increased cross-sectional area without increasing the axial height of assembly 30.

Although the present invention has been described with reference to preferred embodiments, workers skilled in the art will recognize that changes may be made in form and detail without departing from the spirit and scope of the invention.

What is claimed is:

1. A data disc support assembly for supporting at least one high capacity data disc relative to a head so data on a surface of the disc is accessible by the head, the head having a head height, wherein the high capacity data disc is for use with a disc drive in a portable computer, the support assembly comprising:

a hub having first and second axial ends and a flange extending from the second axial end, the flange supporting the data disc; and a clamp connected to the hub to rigidly connect the data disc to the hub, the clamp being a thermally responsive clamp connected to the hub by a thermal shrink fit, the clamp having a first generally annular portion contacting the data disc and a second generally annular portion extending radially away from the hub beyond the first annular portion and being spaced from the data disc by a distance greater than the head height.

2. The support assembly of claim 1 wherein the first annular portion is spaced from the hub.

3. The support assembly of claim 2 wherein the second annular portion is connected to the hub.

4. The support assembly of claim 1 wherein the first and second annular portions are formed integrally with one another.

5. The support assembly of claim 1 wherein the clamp is thermally responsive such that the clamp expands to fit over an exterior surface of the hub when thermal energy is applied to the clamp and contracts to form a frictional connection with the exterior surface of the hub when thermal energy is removed from the clamp.

6. The support assembly of claim 1 wherein one of the first and second annular portions contacts the hub and has a hub receiving end chamfered to receive the hub.

7. A rigid high capacity magnetic disc file for use in a portable computer, comprising:

a hub having a generally cylindrical external surface with a first axial end and a second axial end, and a first support member generally at the second axial end;

a plurality of discs mounted concentrically about the external surface of the hub;

spacer means, mounted concentrically about the external surface of the hub, for separating the plurality of discs from one another axially, the discs and the spacer means being supported by the first support member; and a second support member connected to the first axial end of the hub and having a contact surface contacting an end one of the plurality of discs located axially nearest the first axial end of the hub, the second support member being a thermally responsive clamp ring forming a frictional shrink fit connection with the hub, the second support member holding the plurality of discs and the spacer means between the first support member and the second support member, the second support member having a second surface, out of contact with the end disc, the second surface extending radially away from the hub, beyond the contacting surface.

8. The rigid magnetic disc file of claim 7 wherein the second surface lies on a spaced portion of the second support member axially spaced from the end disc.

9. The rigid magnetic disc file of claim 8 wherein the end disc stores data accessible by a head having a height, and wherein the spaced portion of the second support member is spaced from the end disc by a distance exceeding the height of the head.

10. A method of accessing data on a high capacity rigid magnetic disc file for use in a portable computer, comprising:

provising a hub having a generally cylindrical external surface with a first axial end and a second axial end, and a first support member generally at the second axial end;

providing a plurality of discs mounted concentrically about the external surface of the hub;

providing spacers, mounted concentrically about the external surface of the hub, separating the plurality of discs from one another axially, the discs and the spacers being supported by the first support member;

providing a thermally responsive clamp connected to the first axial end of the hub by a frictional shrink fit connection and having a contact surface contacting an end one of the plurality of discs located axially nearest the first axial end of the hub, the clamp holding the plurality of discs and the spacers between the first support member and the clamp, the clamp having a second surface, out of contact with the end disc, the second surface extending radially away from the hub, beyond the contacting surface;

providing a data head for reading information from and writing information to the end disc; and accessing information stored on the end disc with the data head in an area on the end disc located radially between the contact surface and the second surface of the clamp.

* * * * *